United States Patent
Kiss

Patent Number: 5,687,304
Date of Patent: Nov. 11, 1997

[54] REAL-TIME IMAGE GENERATION SYSTEM FOR SIMULATING PHYSICAL PAINT, DRAWING MEDIA, AND FEATURE MODELING WITH 3-D GRAPHICS

[75] Inventor: Kenneth W. Kiss, Salt Lake City, Utah

[73] Assignee: Parametric Technology Corporation, Waltham, Mass.

[21] Appl. No.: 755,115

[22] Filed: Nov. 22, 1996

Related U.S. Application Data

[63] Continuation of Ser. No. 195,112, Feb. 14, 1994, Pat. No. 5,592,597.

[51] Int. Cl.⁶ .................................................... G06F 15/00
[52] U.S. Cl. .................................................... 395/119
[58] Field of Search ............................... 395/119, 120, 395/130, 141, 142, 143; 345/179

[56] References Cited

U.S. PATENT DOCUMENTS

| | | | |
|---|---|---|---|
| 4,602,286 | 7/1986 | Kellar et al. | 358/183 |
| 4,633,416 | 12/1986 | Walker | 364/521 |
| 4,646,251 | 2/1987 | Hayes et al. | 364/518 |
| 5,237,647 | 8/1993 | Roberts et al. | 395/119 |
| 5,251,160 | 10/1993 | Rockwood et al. | 364/578 |
| 5,592,597 | 1/1997 | Kiss | 395/119 |

FOREIGN PATENT DOCUMENTS

| | | |
|---|---|---|
| 2140257 | 11/1994 | United Kingdom . |
| 2157122 | 10/1996 | United Kingdom . |

OTHER PUBLICATIONS

P. Haeberli et al., "Texture Mapping as a Fundamental Drawing Primitive", 8 pages (Fourth EUROGRAPHICS Workshop on Rendering, Paris, France –June 1993).

H. Sakurai et al., :"Solid Model Input Through Orthographic Views", *Computer Graphics*, vol. 17, No. 3, pp. 243–252 (Jul. 1983).

S. M. Courter et al., "Automated Conversion of Curvilinear Wire–Frame Models to Surface Boundary Models; A Topological Approach", *Computer Graphics*, Dallas, Texas, vol. 20, No. 4, pp. 171–178 (Aug. 1986).

P. Hanrahan et al., "Direct WYSIWYG Painting and Texturing on 3D Shapes", *Computer Graphics*, vol. 24, pp. 215–223 (Aug. 1990).

H.K. Pedersen, "Decorating Implicit Surfaces", *Computer Graphics Proceedings, Annual Conference Series*, pp. 291–300 (Aug. 1995).

K. Inoue, "System–G Enables Real–Time 3D Texture Mapping", *JEE J. Electronic Eng.*, Tokyo, Japan, vol. 27, pp. 64–67 (1990).

P. Haeberli, "Paint By Numbers: Abstract Image Representations", *Computer Graphics*, vol. 24, pp. 207–214 (Aug. 1990).

Product Documentation, "Ray Dream Designer 3.0", Chapter 5 (1992).

*Primary Examiner*—Phu K. Nguyen
*Attorney, Agent, or Firm*—Lahive & Cockfield, LLP

[57] ABSTRACT

A computer graphics painting system defined in terms of three dimensional graphics and texturing mapping. A three dimensional drawing primitive, most commonly a polygonal mesh, is directed along a path specified by a tablet, mouse, or other input stream. The primitive is transformed to sequential locations along the stroke in three dimensional space. At each location the primitive is processed with texture mapping techniques and blended into the frame buffer for real-time display. The brush primitive may take many forms to achieve a wide variety of painting effects and styles. The polygonal mesh form may also be active in conforming to any underlying surface or model data, thus enabling real-time painting of three dimensional objects.

7 Claims, 4 Drawing Sheets

REAL-TIME IMAGE GENERATION SYSTEM FOR SIMULATING PHYSICAL PAINT, DRAWING MEDIA, AND FEATURE MODELING WITH 3-D GRAPHICS

This application is a continuation application of Ser. No. 08/195,112 filed on Feb. 14, 1994, REAL-TIME IMAGE GENERATION SYSTEM FOR SIMULATING PHYSICAL PAINT, DRAWING MEDIA, AND FEATURE MODELING WITH 3-D GRAPHICS. The contents of all of the aforementioned application(s) are hereby incorporated by reference, now U.S. Pat. No. 5,592,597.

BACKGROUND AND SUMMARY OF THE INVENTION

The present development relates to real-time interactive creation of computer graphics images. A variety of computer graphics system peripherals enable the display of electronic imagery. Representative signals are typically raster scanned from a frame buffer memory into the display device. Input is provided by a user through a pointing device. As the user moves the pointing device a trace of the trajectory appears on the display. As described in the Book, *Principles of Computer Graphics*, Second edition, Newman and Sproull, McGraw-Hill Book Company, 1979, Sections 12-4 and 17-2. Various pointing devices can be used to generate strokes of color in a computer graphics display, just as in painting on a canvas.

Computer based paint applications were developed shortly after the first graphics displays became available. Over time the basic techniques have changed very little. A user specifies a stroke through the use of a locational input device and a line is drawn connecting each input location, or a dot is drawn at each location. These lines or dots were intended to visually represent a pen or brush stroke. Generally, as the terms "paint" and "brush stroke" are used below, they are deemed to embrace painting, inking and so on to accomplish various effects or formats as a brush, airbrush, and so on.

As a stroke is defined using the basic techniques, screen picture elements (pixels) within a specified distance from the input location are colored appropriately. Recently techniques have been refined so that new paint data blends with existing picture information instead of just writing over it. These techniques require tremendous amounts of color and transparency blending processing, putting real-time performance beyond the capabilities of most similar applications. This pixel based approach imposes limitations as to painting techniques, effects, and primitive forms. Such systems are disclosed in U.S. Pat. Nos. 4,602,286 (Kellar, et al.) and 4,633,416 (Walker).

Traditional two dimensional pixel based computer-paint systems have been generally embraced by the artistic, design, and entertainment communities. This widespread application comes despite serious limitations with regards to both expense and interactive performance. Current systems are either very expensive due to the special purpose computer hardware required to achieve acceptable performance levels or are slow so as not to accurately reproduce the feel of a physical drawing tool. Inadequate performance is the result of the large amount of processing that is required to color a single pixel in the display device. General purpose processors are unable to process the input at rates necessary to mimic the feel of physical tools.

More recently artists trained in three dimensional modeling and animation techniques wish to paint directly on three dimensional objects rather than simply on a flat canvas. A solution to this requires an object space system which accounts for lighting and other environmental factors. Research along these lines has resulted in a geometric pick and color solution that assigns a new color to the picked polygons and redraws them. Such a solution is restricted to operate along the polygonal borders of the object being painted. All color changes are hard edged and follow the angular edges of the polygonal model. The result appears very unnatural and geometric. A realistic looking result is only attained by generating a secondary output of texture maps that correspond to the "painted" data which can then be used as input to a software renderer. Such a system is described in Computer Graphics, Volume 24, No. 4, August 1990, in an article titled *Direct WYSIWYG Painting and Texturing on 3-D Shapes*, Hanrahan and Haeberli. The limitations of such a system are prohibitive to the point that there is no known commercial system available based on these techniques.

Prior two dimensional paint systems are based on pixel operations and output while research into three dimensional paint systems is limited to coloring polygons in the existing model structure. This inherent difference between two dimensional and three dimensional techniques is a primary reason for the absence of a widely known, commercially viable three dimensional paint system. True three dimensional painting requires a technique that bridges the gap and combines the appropriate technology from both two dimensional and three dimensional graphics techniques.

The present development takes a new approach to traditional two dimensional painting and provides a viable solution to the three dimensional problems. The approach involves the use of a three dimensional graphic primitive as the basic painting unit rather than pixels. Utilizing such a higher level primitive results in a far more flexible and powerful painting tool. The three dimensional drawing primitive utilizes all the acceleration and functionality of generally available three dimensional computer graphics accelerator devices. Dependence on the host computer processor for performance is eliminated and may be shifted to the graphics accelerator. Virtually any physical drawing tool can be electronically duplicated by using hardware accelerated texture mapping. The basic drawing primitive may also take various forms including a simple polygon, a set of polygons such as a cube or sphere, or any form of polygonal mesh or surface. The polygonal mesh may be subdivided to varying degrees in both the horizontal and vertical dimensions to produce numerous characteristic variations. The use of a three dimensional painting primitive provides a bridge between two dimensional and three dimensional graphics and resolves many of the problems mentioned previously. One method to perform true three dimensional painting is accomplished by holding two dimensions of the polygonal mesh constant and making the third dimension conform to underlying surface information. A typical implementation will hold the X and Y components of the mesh primitive constant while allowing the Z component to be modified to match the underlying surface data at each vertex in the brush mesh. In this sense the three dimensional brush has substantially the same characteristics as the flat canvas brush except that it conforms to the shape of the underlying surface at that location. The three dimensional brush primitive is processed through the accelerated three dimensional graphics pipeline resulting in the visual effect of painting in real-time on either a canvas or some underlying three dimensional surface.

BRIEF DESCRIPTION OF THE DRAWINGS

The drawings which constitute a part of the specification are exemplary embodiments exhibiting various objectives and features herein, specifically.

DESCRIPTION OF THE ILLUSTRATIVE EMBODIMENT

As required, a detailed illustrative embodiment of the present invention is disclosed herein. However, computer graphics systems, painting structures, primitive forms, graphics processing and component operating structures utilized in accordance with the present invention may be embodied in a wide variety of forms, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. With regard to prior systems, some of the basic characteristics of input and drawing are known.

Figure 1:
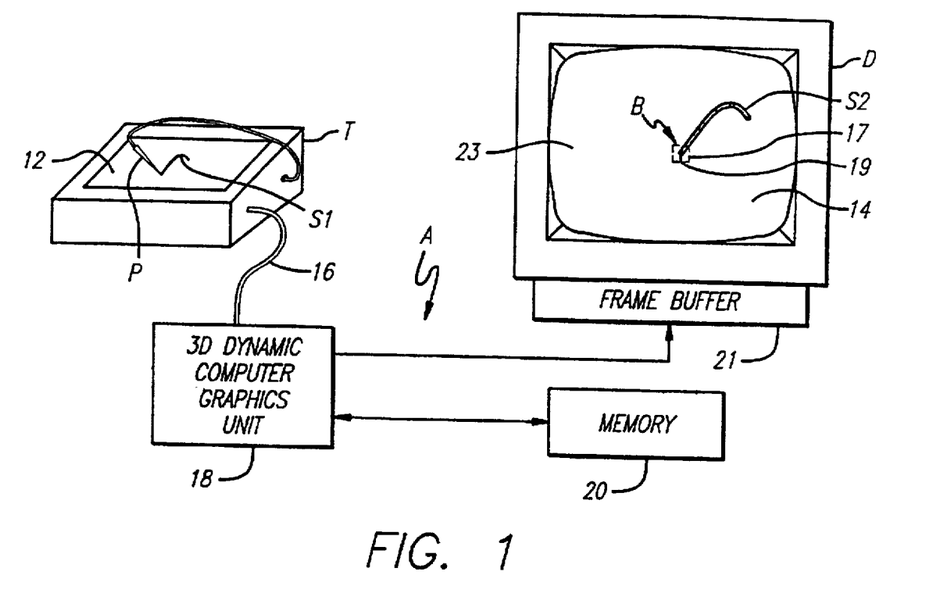
FIG. 1 is a block diagram and perspective view of a system in accordance with the present invention.

Referring to FIG. 1, a pointing device, here represented as an electronic digitizing tablet T is connected through a computer graphics system A to a display device D. The display device graphically represents paint strokes which coincide with trajectories of a moving stylus P associated with the digitizing tablet T. Stroke S1 as defined by a user with stylus P, results in the response of an electronic brush B to produce a persistent paint stroke S2 on the display device D. The paint stroke S2 is rendered in real-time and may reflect any of numerous effects including conforming to a surface in three dimensional painting. The digitizing tablet T provides a working surface 12 for the stylus P. The electronic representation of the brush B (polygon 17 and circle 19, treated below) responds to the trajectory of the stroke S1 on the surface 12 in order to visualize the stroke S2 as paint on the screen 14.

The pointing device may take various forms but is represented here as a digitizing tablet T with a pressure sensitive stylus P. Many such devices commercially available from several manufacturers, are suitable for use with this system as described. The stylus signals are provided through a cable 16 to a graphics unit 18. Structurally, the graphics unit 18 comprises a dynamic three dimensional computer operating in cooperation with a memory 20 to drive a frame buffer 21 associated with the display device D. In the disclosed system, the display device D includes a cathode ray tube 23 defining the screen 14.

The digitizing tablet T provides both coordinate signals according to stylus position and force or pressure signals according to the pressure applied to the stylus P. While a sequence of position signals define with stroke S1, the pressure signals may influence a variety of brush characteristics such as size, transparency, and color. Therefore, any number of characteristics of the rendered stroke S2 may be modified by the pressure applied to the stylus P.

Note that the system of FIG. 1 does not simply color pixels within a specified distance from the stroke trajectory. Rather, a three dimensional primitive is employed and combined with texture mapping techniques to appear as a brush or other physical drawing tool on the screen 14. Any three dimensional object may be used as the brush primitive, however the preferred primitive for this embodiment for both speed and flexibility is a polygonal mesh (described below). The characteristics of this mesh are not constant and may be modified at user discretion. The brush may actually be represented by any three dimensional graphics primitive including (but not limited to) a cube, a sphere, a polygonal shape, or a surface. Likewise, the polygonal mesh mentioned previously is not required to remain in any given plane. The mesh itself may take on values in any dimension to enable painting with any shape in any dimension. Most commonly, the X and Y dimensions of the mesh are fixed and the Z dimension is active to accomplish the three dimensional painting as mentioned above.

The polygonal mesh which represents the basic drawing primitive is rendered in conjunction with a texture map. For most brush types the texture map is a circle with some degree of transparency fall off with increasing distance from the center, but in practice the texture map may consist of any shape and transparency characteristics. It is the texture map which gives the rectangular shaped polygonal mesh the soft round appearance of an airbrush or the harder round point of a pencil. The texture mapped polygonal mesh is drawn in a sequence of locations as specified by the stroke S1 to produce the visualization of the stroke S2. Brush strokes are rendered on the screen by drawing the texture mapped polygonal mesh at a series of overlapping locations to give the appearance of a smooth stroke.

Traditional three dimensional computer graphics involve the use of sets of polygons to define solid areas or volumes. Graphical objects are defined by solid volumes that in turn are defined by primitive polygons. Traditionally, the polygons are transformed and processed to produce animations and computer graphics imagery. These techniques are well known and widely employed. Related processes are described in U.S. Pat. Nos. 3,816,726 Computer Graphics Clipping System for Polygons, Sutherland, et al.; and 3,889,107 System of Polygon Sorting by Dissection, Sutherland. Detailed operations and structures of polygon manipulation and display are disclosed in the above referenced book, *Principles of Computer Graphics*, section 16-1.

Texture mapping polygons and surfaces is also a well known and widely used technique in computer graphics; e.g., see U.S. Pat. No. 4,855,943, System for Texturing Computer Graphics Images, Robinson. Texture mapping is typically used to add detail and realism to computer rendered objects and scenes. Texturing enables the modulation of color and transparency across a single polygon, a set of polygons, or any other graphic primitive. In the scenario of the present invention a single channel transparency texture map is employed to enable most traditional brushes and brushing operations. This provides the most flexible implementation by permitting all brush parameters except for the local transparency characteristics to be controlled by simple primitive or context attributes. The texture map, however, is not limited to a single channel or brush transparency characteristics. It may consist of multiple channels which contain a wide variety of visual information. A single channel texture map consists of a two dimensional grid of data values. These data values may pertain to any visual component of the drawing primitive including color or transparency. Multi-channel texture maps are an association, or grouping, of more than one data grids with each channel pertaining to a different visual characteristic.

Figure 2:
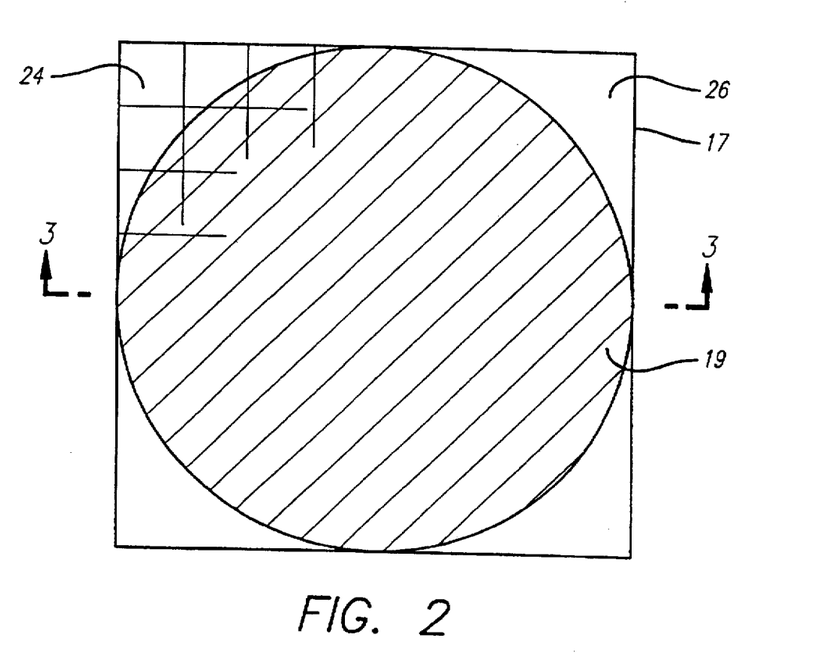
FIG. 2 is a graphic representation illustrating a functional aspect of the painting operation of the system of FIG. 1.

Referring to FIG. 2, the brush components are shown considerably enlarged. The polygonal mesh 24 (at polygon 17) is shown with the maximum perimeter of an exemplary texture map for a round brush (circle 19). Polygonal mesh primitives are well known in the art as described in the book, *Fundamentals of Interactive Computer Graphics*, Foley and Van Dam, 1984, Addison-Wesley Publishing Company, see section 15.9 regarding curved surfaces. The function and behavior of the polygonal mesh are treated in greater detail later in this description.

The polygonal mesh 24 (FIG. 2) is mathematically defined in the system 18 (FIG. 1) and is transformed to sequential locations as directed by the stylus P, to display or render the stroke S1 on the display screen as stroke S2 in real-time. To form the stroke S2 (FIG. 2) in the display, each instance of the polygonal mesh 24 is drawn cumulatively into the frame buffer 21. The texture mapped polygonal mesh writes over and blends with existing display data in the frame buffer 21, and remains visible until subsequently drawn over and obscured or explicitly cleared. This is in accordance with traditional physical painting on a canvas.

In the scenario of painting on a flat canvas, processing the polygonal mesh 24 is accomplished through basic three dimensional affine transformations. The painting canvas is presented through any three dimensional viewing transformation or projection. The size of the brush is controlled by a local three dimensional scale operation applied to the polygonal mesh with the X and Y scale factors set to the specified brush size and the Z scale factor set to one. The location of the stylus P on the digitizing tablet determines the X and Y translation factors and thus the position of the brush on the screen. This mechanism fully utilizes basic three dimensional principles and capabilities of any three dimensional graphics accelerator to provide real-time two dimensional painting tools. Several graphics interface standards are currently available that provide a program interface to the graphics functionality required.

To this point it has been shown that a texture mapped three dimensional primitive, exemplified by a polygonal mesh 24, can be utilized to produce the visual appearance of real-time two dimensional painting and drawing. Other physical brush parameters are related to the force or pressure applied to stylus P along a stroke to more closely simulate the tools used by a traditional artist. The overall transparency of the electronic drawing tool can be a function of stylus pressure. The pressure is converted to a transparency value through a user controlled algorithm and applied globally to the brush primitive. This global transparency works in conjunction with the local transparency of the texture map to produce a brush that is transparent to the proper degree even where the texture map is completely opaque. The fine art technique of putting different paint colors on opposing sides of a brush can be simulated using graphical color interpolation techniques. This electronic analogy also enables multi-color effects not available with physical tools through the use of assigning colors to each vertex of the polygonal mesh. These include stippled color variations and radial color transitions in addition to traditional linear transitions.

Transformations in the Z dimension are facilitated by the present invention since the painting primitive is three dimensional. In this regard the brush primitive can be transformed through rotate, translate, and scale operations in Z as well as X and Y. From this it is possible to generate true three dimensional effects. The brush can be moved towards or away from the user giving the effect of new paint appearing in front of or behind existing paint or drawings as in masking or layering applications. Rotations in Z make the brush plane non-parallel to the viewing plane enabling many effects including simple perspective.

The geometric basis for the standard brushes is the polygonal mesh 24 as shown in FIG. 2. The representation shows the polygonal mesh to the quadrilaterals, but it may also be triangles or any other appropriate mesh primitive. The graphical element used for the drawing primitive may be defined in any appropriate coordinate space. The density of the mesh within these bounds may vary from 2×2 with no internal subdivisions up to any practical limit. The number of subdivisions need not be equal in the X and Y dimensions and the subdivision density may also vary along both axes. When painting in the flat canvas scenario the Z values in the mesh are some constant value. However, when painting on an underlying three dimensional surface each Z value in the mesh changes with every instance of the brush primitive. The degree to which the polygonal mesh conforms to the surface is a function of the proximity of the mesh subdivisions. The subdivisions become closer together either through reducing the size of the brush or increasing the number of subdivisions or both. Other techniques may be employed whereby the mesh automatically subdivides as necessary to conform to the surface being painted on. This self-adapting technique may be based on any spatial relationship or property of the surface including angular tolerance, spatial differences, or chord deviations.

Figure 3A:
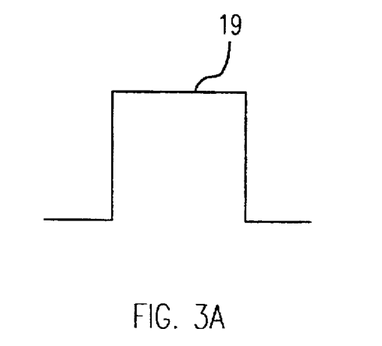
FIGS. 3a, 3b, 3c and 3d are graphic representations related to FIG. 2.
Figure 3B:
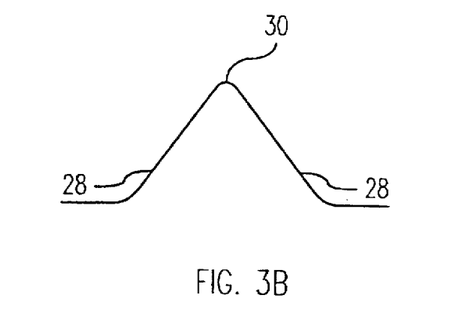
Figure 3C:
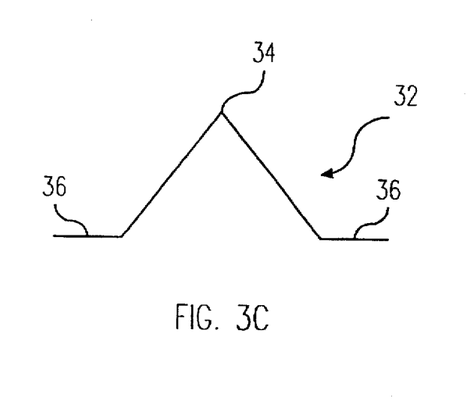
Figure 3D:
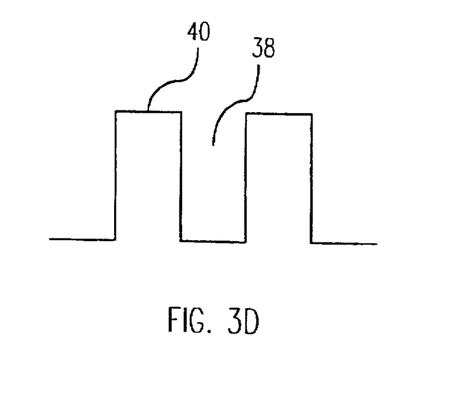

As discussed above, the basic painting primitive may be virtually any three dimensional surface or polygonal element. The texture map applied to the brush primitive is equally as flexible and may take many forms. The definition of the texture map may be generated, read from a data file, or even captured from the frame buffer. Consider a transparency texture map as defined by a standard gaussian distribution. This produces a transparency map that is opaque in the center and becomes gradually more transparent as distance from the center increases, according to the distribution, until it becomes completely transparent. The texture map in this case holds only transparency information using the color as specified in the graphics context. In this case the graphics context is simply the current-state of all parameters that affect the visual display of any graphic primitive. The transparency texture map used for all normal brushing may consist of various transparency distributions or fall off including conical, spherical, or any user designed profile. Examples of this are shown in FIG. 3. Texture maps of more than one channel may also be utilized in conjunction with the brush primitive. These multi-channel textures may contain as many channels as are supported by the texture mapping unit. A full multi-channel texture map enables highly complex brushes and brush patterns by combining detailed color data with transparency information and other visual data. For example, considering FIG. 2 in a cross-section along the line 3—3 indicates space as the abscissa with opacity as the ordinate and provides the representation of FIG. 3a. Essentially, the circle 19 is shown as a section through a symmetrical cylinder defining an opaque brush. Another variation of the texture map may be somewhat like an airbrush and is depicted in FIG. 3b. The sectional representation of the symmetrical texture map involves a brush that is progressively more transparent toward the edges 28 and is completely opaque at the center 30. While, a multitude of possibilities exist, consider another example. FIG. 3c represents a conical configuration sectioned as a triangle 32. Again, brush transparency falls off from opaque 34 to completely transparent a given distance from the center 36. As still another possibility, FIG. 3d illustrates a texture map with a central void 38. Accordingly, the opaque or intense area of the map is defined as a toroid 40 that might be variously colored. Again, the formats are merely representative of a multitude of possibilities. Although these examples all use symmetrical texture maps, asymmetrical maps according to shape or transparency may also be used.

Figure 4:
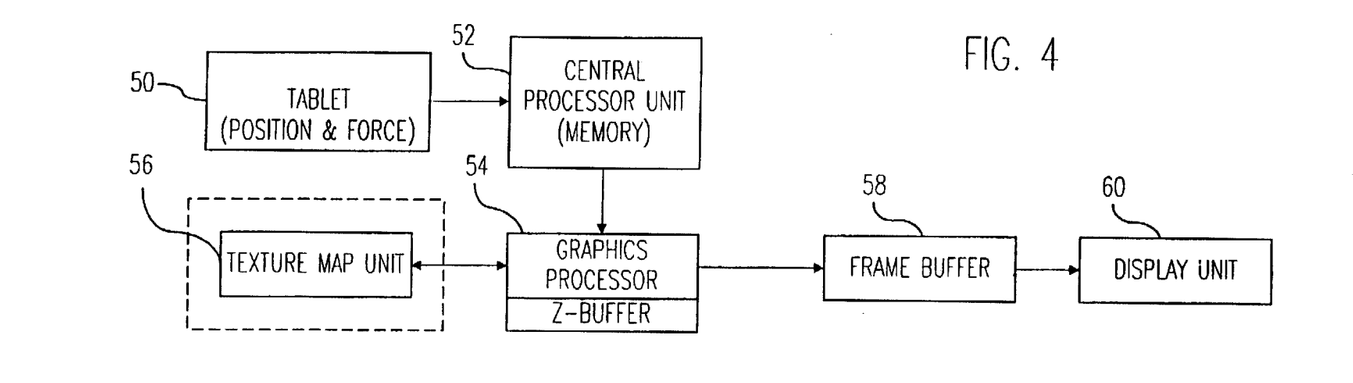
FIG. 4 is a teaching block diagram of the system of FIG. 1.

The block diagram in FIG. 4 shows the structural aspects of the system. A pointing device, again shown as a digitizing tablet 50, provides X, Y planar coordinate or position input signals, along with a force or pressure signal to a central processor unit 52. This central processor 52 defines the brush primitive and executes preliminary data processing for a graphics processor 54. The main processor 52 provides three dimensional graphics primitive data to the graphics processor 54, which performs all three dimensional processing. The graphics processor 54 executes texture mapping operations using data from a texture memory 56, as well as all transformation and lighting operations. The resulting data is drawn into a frame buffer 58 for driving a display unit 60.

Computer graphics systems consisting of a central processor unit 52 and a graphics processor 54 are disclosed in the reference book, *Fundamentals of Interactive Computer Graphics*, Foley. As known in the art, graphic primitives are processed in the graphics processor 54 and scan converted for display in the frame buffer 58. In the present system, the tablet 50 provides coordinate information to the central processor unit 52 to define subsequent primitive transformations for the graphics processor 54. The defined primitive is processed as explained above, ultimately being visualized as the brush B (FIG. 1). With respect to physical painting, all subsequent strokes overwrite and blend with previous strokes and existing background until explicitly cleared. Furthermore, any colors or patterns which result on the display may be sampled or read back from the frame buffer for use in subsequent painting or drawing operations.

Figure 5:
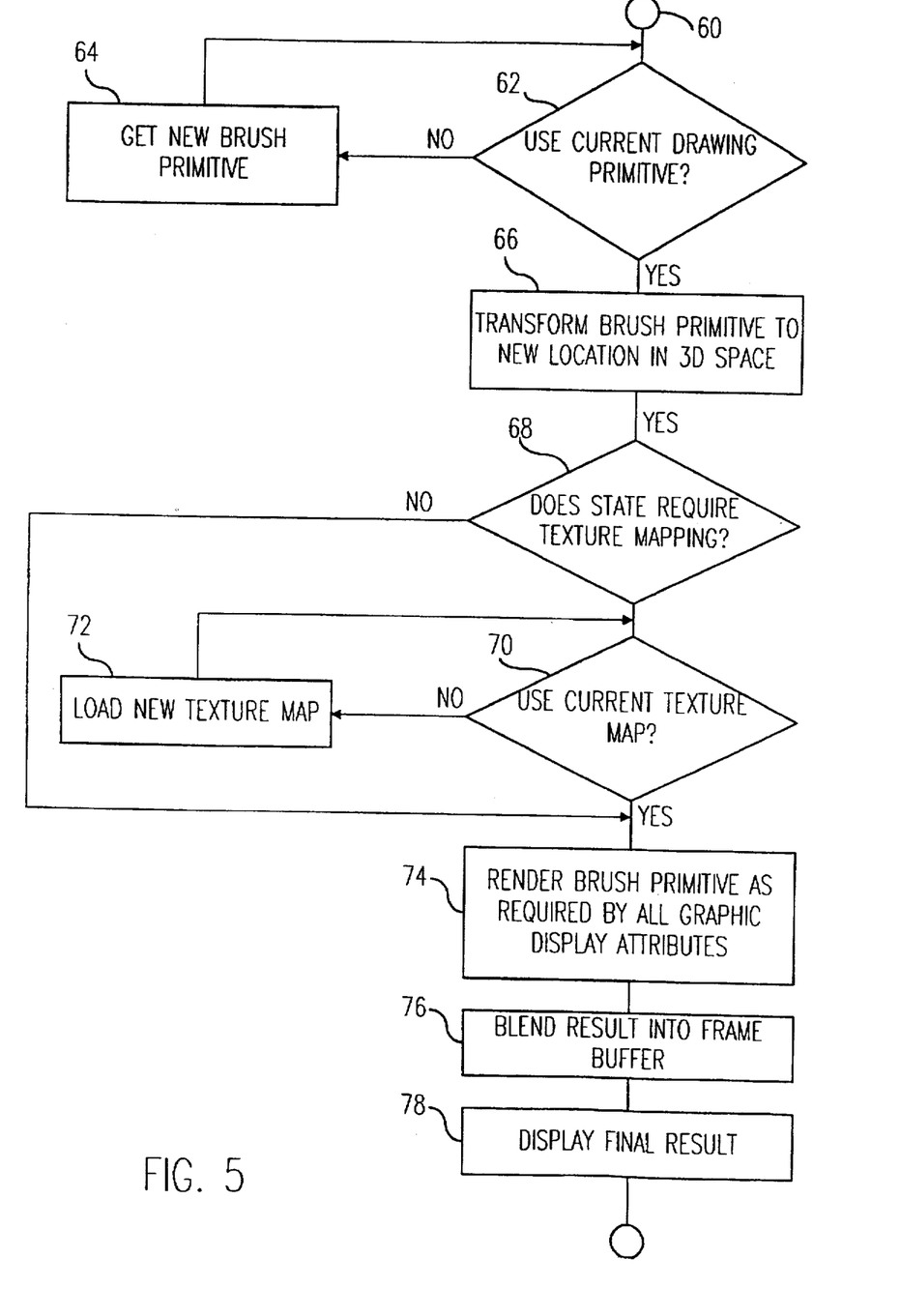
FIG. 5 is a flow chart illustrative of one aspect of operation in the system of FIG. 4.

The basic operation of the system in FIG. 4 is treated in FIG. 5. From the entry point 60 an initial query involves the drawing primitive (texture map) to be used. As indicated by query block 62, if the current drawing primitive is to continue use there is no change. Otherwise, as indicated by block 64, a new drawing primitive or texture map is designated for use and loaded. Once the appropriate drawing primitive is loaded, it is transformed to the proper size, position and orientation as indicated by block 66. With the transformation completed, the process advances to query block 68 to determine whether or not texture mapping is to be applied. If texture mapping is not required, the process branches, around the next query block 70 which determines if the current texture map is to continue use. If not the process continues to block 72 where the new texture map is loaded into texture memory 56. At this point all process flow options come back together and continue to block 74. At this point, the current brush primitive is sent to the graphics accelerator where it is properly rendered according to current color and material selections, environment lighting, and the current texture map and texture mapping parameters. Processing then continues to block 76 where the result from block 74 is blended appropriately in to the frame buffer. The process is completed when the frame buffer is visualized on the display device in real time. As subsequent input from the input device is received the brush primitive is transformed to new locations and processed again according to the same procedure.

Once the appropriate drawing primitive is loaded, it is transformed to the proper size, position and orientation. With the transformation completed, the process may advance to determine whether or not texture mapping is to be applied. From the block 62, the process is outlined through a series of block-represented steps as illustrated. Specifically, the process is indicated by blocks: 66, 68, 70, 72, 74, 76, 78, 80, 82, 84, 86 and 90.

From the above description it is apparent that the system described utilizes three dimensional graphics to position and size a three dimensional brush primitive according to user input. The brush is comprised of a geometric component, typically a polygonal mesh, and a texture map component. It is the texture map component that imparts shape and local transparency characteristics to the visualized brush. The result is very similar to physical drawings or paintings on paper or other physical medium.

The system may also be utilized to accomplish three dimensional painting. That is, painting directly on a three dimensional object in a scene with respect to lighting and all other components in the scene. The three dimensional object or scene to be painted on may be displayed as a shaded object in any view under any lighting conditions. The operation of the system in this sense is very similar to that used to produce a visually two dimensional result. The polygonal mesh, representing the drawing primitive, is scaled and translated to the appropriate location according to user input. At this point the X, Y coordinates are converted from model space to screen space by passing them through the current transformations. These screen space X, Y coordinates are then used as indices into the Z-buffer depth buffer, and new Z values are obtained for each vertex in the polygonal mesh. The actual Z or depth data may also be generated from a mathematical surface description evaluated at each X, Y coordinate, or read from a copy of the actual Z-buffer at a known state stored in the memory unit. New vertex normals are then computed for each vertex in the polygonal mesh to ensure proper visual display. In this sense the brush conforms to the surface being painted as closely as possible given the constraints of the polygonal mesh. This technique requires the availability of a Z-buffer in the graphics processor 54 or frame buffer as described in the above referenced book, *Fundamentals of Computer Graphics*, section 15.5.

This technique may also be used to alter the appearance of the surface. The vertex normals which are generated to ensure accurate visual display of the painted surface can be perturbed either randomly or systematically through the brush tool to make the surface appear rough or mottled. The magnitude of the effect of the normal perturbation is subject to several controlling factors. The perturbation can be constrained to very small differences from the original computed normal producing the visual appearance of sand or small ripples. If the normals are perturbed further from the actual the surface may appear mottled. The relative proximity of the polygonal mesh subdivisions also plays a role in the appearance of the surface when the normals are subject to perturbation. Closer subdivisions produce a finer grained surface appearance like sand while further spacing of subdivisions produces larger surface deformities such as waves or rolling hills.

The beginning and ending of the three dimensional painting process are similar to the initially described technique for two dimensional painting. The distinct intermediate steps consist of managing the vertices and representing the conforming polygonal mesh operation. It is these steps that enable the drawing primitive to take on a different shape in the Z dimension with every instance. The polygonal mesh wraps itself onto the surface being painted or drawn on by referencing the depth Z values associated with the surface. In practice a physical surface is not required as the necessary surface information may be generated algorithmically or by any of a variety of other means.

Under the circumstances of painting in three dimensions, the performance of the painting or drawing tool is insensitive to the complexity of the model or surface being painted on. The performance imparted by the conforming polygonal mesh is sensitive only to the number of subdivisions in the polygonal mesh and the speed of the three dimensional graphics pipeline in the graphics accelerator. The polygonal mesh conforms to the underlying surface by virtue of sampling appropriate Z value from the graphics accelerator or frame buffer. The degree to which the polygonal mesh primitive conforms to the surface is a function of the mesh subdivision spacing. The closer the spacing the tighter the mesh will conform to the surface. This spacing can be effected by either changing the number of subdivisions or changing the size of the brush or a combination of both. Subdivisions spaced widely apart cause the mesh to conform loosely potentially eliminating detail. The polygonal mesh conforms closer to the actual surface as the subdivisions get closer, ultimately preserving even the smallest detail. The visual result is that of painting with the selected brush and paint parameters directly on a three dimensional surface. Paint is a much more complex medium when considered in the three dimensional scenario as well. Paint in this context may be represented by more than a simple color, but may also be represented by all the properties of physical paint including ambient, diffuse and specular colors, shininess, and surface roughness.

The concept of the conforming mesh in the three dimensional paint scenario can take on other variations. One such variation enables the painting of actual geometric changes or detail onto an existing surface or model. This again requires the use of a polygonal mesh as the brush primitive. The difference is that only certain portions of the mesh are permitted to conform to the surface. The rest of the polygonal mesh has a defined shape relative to the conforming vertices. This enables an artist to paint a groove or any other positive or negative detail onto the existing surface based on the inherent relative shape of the polygonal mesh. In addition to painting new geometric data, the conforming polygonal mesh primitive can also be used to duplicate surfaces or geometric features. The depth information can be received as source from a location on the surface or model and then transferred to another location and orientation through the normal mechanisms of brush control discussed above. Furthermore, entire geometric volumes may not only be utilized as the brush source data, but may also be used as the actual brush primitive. The volume may then be manipulated and placed back into the scene or onto the model at any location or orientation. This kind of painting method goes beyond basic visual painting to the concept of truly modelling geometric data with a painting device. It is conceivable that entire geometric models or surfaces can be painted utilizing this technique.

The data generated by the above described three dimensional painting process goes beyond the static image resulting on the display device. Since the paint is applied directly on three dimensional data it is possible to compile and extract the painted information for use as a texture map in the traditional sense. Creating the texture maps with this approach ensures perfect placement of texture maps exactly as painted on the surface or geometric data. This enables painted data to be utilized as input to animation and rendering in traditional three dimensional applications.

Figure 6:
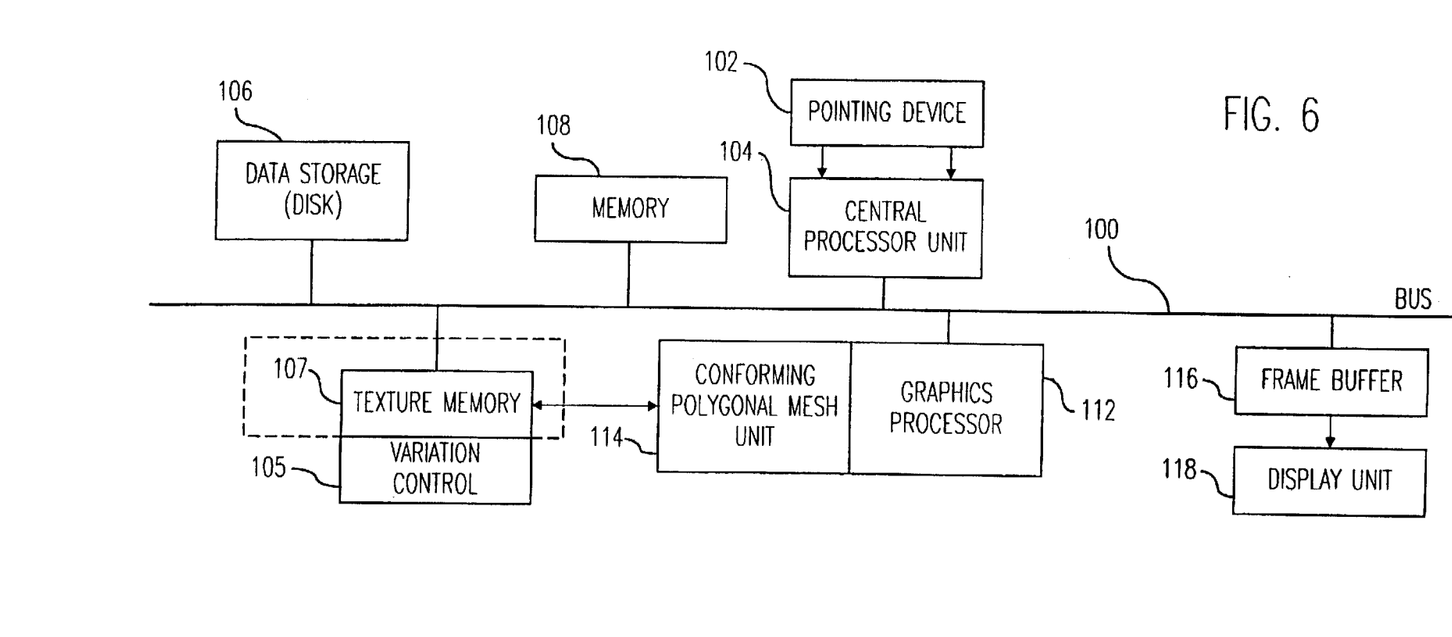
FIG. 6 is a block diagram representing a structure implementing the system of FIG. 1.

In consideration of a comprehensive hardware embodiment, reference will now be made to FIG. 6 illustrating components of the system interconnected by a data bus 100. Although some elements of the system have been treated previously, a new set of numerals are used to accommodate for potential component variation. A moveable pointing device 102 provides input information, including position and pressure, to a central processor unit 104, which is subsequently connected to the data bus 100. Three storage structures are utilized in this embodiment. Basic data is contained in a general data storage unit or disk 106, current brush information and characteristics are held in memory 108, and the texture map which is used with the current brush or drawing tool is held in texture memory 107.

Data files containing brush transparency characteristics are loaded from data storage 106 into memory 108 on an as needed basis. These local transparency characteristics may also be generated, be a function of other data, or be read from the frame buffer 116. This data is then processed and loaded into texture memory 110. Subsequently, the texture will apply to all drawing primitives until a new texture map is loaded or selected. The geometry used for the brush primitive is also generated as needed and stored in memory 108.

The central processor unit 104 sends the brush primitive from memory 108 to the graphics processor 112 along with other pertinent graphics data including transformations, color, and transparency. The graphics processor 112 then draws the primitive into the frame buffer 116 as appropriate and according to the specified transformations and other graphical information. The frame buffer is immediately visualized on the display unit 118, thus giving the impression of a paint brush drawing in real-time. The force or pressure applied to the pointing device may vary several of the brush appearance parameters including color, size, and transparency. All of these may be interpolated through a specified range according to pressure response characteristics.

When painting on an underlying surface or model instead of a flat canvas, the mesh conforming unit 114 is active. This enables the polygonal mesh Z values to be updated with each instance of the brush to match the underlying surface at that point. The operation of the mesh conforming unit 114 is the last step in the brushing process before the primitive is sent to the graphics processor 112 to be drawn into the frame buffer 116. The mesh conforming unit 114 samples new Z depth values from the frame buffer and computes a new vertex normal for each vertex in the polygonal mesh primitive. The process then continues with the graphics processor 112 drawing the brush primitive into the frame buffer for immediate display.

The three dimensional operation of the system in FIG. 6 is similar to that illustrated in FIG. 5. The primary difference is the additional query that occurs after the completion of the step of transforming the brush primitive. Following this step a query is raised to determine if the brush primitive is a conforming mesh. If so the mesh conforming structure is activated before proceeding in order to sample new Z depth values from the underlying surface. Then the primitive is sent to the graphics processor and drawn as explained previously.

From the above it is apparent that the system disclosed herein utilizing a three dimensional graphic primitive to visualize a drawing tool offers true real-time three dimensional electronic painting. The power and flexibility of three dimensional graphics enables performance, functionality, and effects beyond the traditional two dimensional pixel based approach. This system utilizes three dimensional polygonal processing and texture mapping techniques rather than simple pixel processing as in other prior systems. Real-time paint and drawing performance is achieved using relatively common and inexpensive structural forms. Recognizing that the system is implemented with standard three dimensional graphics components it should be noted that considerable variation may occur in the specific components and operating format. The scope of the present invention should be determined with reference to the claims set forth below.

What is claimed is:

1. In a computer system having memory and a movable pointing device, a brush for producing a brush stroke that paints a three dimensional object which is displayed in two dimensions on a graphics display device, said brush comprising, primitive data defined by a conforming polygonal mesh and stored in said memory for defining the size of said brush, wherein said brush in response to the movement of said pointing device produces a paint stroke on said three dimensional object indicative of said primitive data.

2. A brush as recited in claim 1, further comprising, texture map data stored in said memory for representing a texture map corresponding to said polygonal mesh of said primitive data.

3. A brush as recited in claim 1, wherein said primitive data conforms to the surface geometry of said three dimensional object.

4. A system for painting a three dimensional object on a computer wherein a pointing device is moved to define a paint stroke and a graphics display unit exhibits the paint stroke, said system comprising:

a central processor including means for receiving, from said moved pointing device, stroke signals defining said paint stroke as a series of locations on said three dimensional object, and means for providing primitive signals representative of a three-dimensional primitive at said series of locations and corresponding to a polygonal mesh;

a texture memory for storing texture data representative of a texture map of said three-dimensional primitive;

a graphics processor coupled to receive said primitive signals and including means for rendering said primitive signals at each of said series of locations according to said texture map to provide picture element signals representative of said paint stroke on said three dimensional object; and a storage buffer including means for storing display data for driving said display unit, wherein said display data includes data representative of said picture element signals from said graphics processor blended with data representative of previous paint strokes.

5. A system according to claim 4 wherein said texture map includes transparency information.

6. A system according to claim 5 wherein said pointing device further provides force signals representative of the force manually applied to said pointing device and wherein graphics processor varies said picture element signals in accordance with both said force signals and said texture map.

7. A process for painting a three dimensional object on a computer wherein a painting device is moved to define a paint stroke and a display unit exhibits the paint stroke in real-time, the process including the steps of:

defining said paint stroke as a series of locations traversed by said pointing device on said display unit;

providing primitive signals representative of a three dimensional primitive at said series of locations and corresponding to a polygonal mesh;

storing texture data representative of a texture map of said three dimensional primitive;

rendering said primitive signals at each of said series of locations according to said texture map to provide picture element signals representative of said paint stroke; and storing display data for driving said display unit, wherein said display data is representative of said picture element signals blended with data representative of previous paint strokes.

* * * * *